US011568007B2

(12) United States Patent
Sharma et al.

(10) Patent No.: US 11,568,007 B2
(45) Date of Patent: Jan. 31, 2023

(54) METHOD AND APPARATUS FOR PARSING AND REPRESENTATION OF DIGITAL INQUIRY RELATED NATURAL LANGUAGE

(71) Applicant: Walmart Apollo, LLC, Bentonville, AR (US)

(72) Inventors: Arpit Sharma, Santa Clara, CA (US); Vivek Kaul, Mountain View, CA (US); Shankara Bhargava Subramanya, Santa Clara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 156 days.

(21) Appl. No.: 16/585,235

(22) Filed: Sep. 27, 2019

(65) Prior Publication Data

US 2020/0110784 A1 Apr. 9, 2020

Related U.S. Application Data

(60) Provisional application No. 62/740,909, filed on Oct. 3, 2018.

(51) Int. Cl.
*G06Q 30/00* (2012.01)
*G06F 16/9535* (2019.01)
(Continued)

(52) U.S. Cl.
CPC ...... *G06F 16/9535* (2019.01); *G06F 16/9532* (2019.01); *G06Q 30/0625* (2013.01); *G06Q 30/0633* (2013.01)

(58) Field of Classification Search
CPC ..... G06Q 30/0601–0643; G06Q 30/00; G06Q 30/0607; G06Q 30/0633; G06Q 30/0641; G06F 16/9532; G06F 16/9535
See application file for complete search history.

(56) References Cited

U.S. PATENT DOCUMENTS 5,832,212 A * 11/1998 Cragun ............... G06F 16/9535
714/37
6,336,099 B1 * 1/2002 Barnett ............... G06Q 30/0271
705/14.35
(Continued)

OTHER PUBLICATIONS

New version of alexa web search service gives any developer tools to innovate in search at web scale. (Jun. 6, 2007). Business Wire Retrieved from https://dialog.proquest.com/professional/docview/1070823492?accountid=131444.*
(Continued)

*Primary Examiner* — Christopher B Seibert
(74) *Attorney, Agent, or Firm* — Morgan, Lewis & Bockius LLP; Manita Rawat (57) ABSTRACT

An e-commerce voice representation system is provided and generally includes a server, a database, and a customer computing device. The server may generate a hierarchical ontology to semantically represent user queries generated by the customer computing device. The server may receive from the customer computing device data representing an e-commerce user query. The server may parse the e-commerce user query based on syntactic dependencies between the words in the e-commerce user query and translating those dependencies into semantic relations between the words. The received e-commerce user query may be tagged with actions, entities, and properties of the hierarchical ontology. Identified products may be linked to conceptual classes of the hierarchical ontology. Syntactic dependencies between words of the e-commerce user query may then be determined, and a semantic representation of the e-commerce user query may be generated based on the syntactic dependencies and mapping rules.

20 Claims, 8 Drawing Sheets

(51) Int. Cl.
*G06Q 30/06* (2012.01)
*G06F 16/9532* (2019.01)

(56) References Cited

U.S. PATENT DOCUMENTS

| | | | | |
|---|---|---|---|---|
| 7,310,601 B1 * | 12/2007 | Nishizaki | | G10L 15/32 |
| | | | | 704/E15.049 |
| 8,359,642 B1 * | 1/2013 | Wurtenberger | | G06F 21/10 |
| | | | | 726/1 |
| 8,875,257 B1 * | 10/2014 | Wurtenberger | | H04N 21/4542 |
| | | | | 715/752 |
| 9,620,111 B1 * | 4/2017 | Bell | | G06Q 30/02 |
| 10,885,091 B1 * | 1/2021 | Meng | | G06F 16/24578 |
| 10,896,457 B2 * | 1/2021 | Arnett | | G06Q 30/0643 |
| 2002/0048350 A1 * | 4/2002 | Phillips | | G10L 15/06 |
| | | | | 704/E15.02 |
| 2004/0117384 A1 * | 6/2004 | Ray | | G06Q 20/04 |
| 2005/0043940 A1 * | 2/2005 | Elder | | G06F 16/24522 |
| | | | | 704/9 |
| 2005/0125301 A1 * | 6/2005 | Muni | | G06Q 30/06 |
| | | | | 705/23 |
| 2007/0256093 A1 * | 11/2007 | Hiler | | H04N 21/472 |
| | | | | 725/28 |
| 2008/0010170 A1 * | 1/2008 | Chan | | G06Q 10/087 |
| | | | | 705/28 |
| 2008/0155614 A1 * | 6/2008 | Cooper | | H04N 21/222 |
| | | | | 705/26.1 |
| 2009/0240518 A1 * | 9/2009 | Borom | | G06Q 30/0601 |
| | | | | 705/14.1 |
| 2010/0011322 A1 * | 1/2010 | Billmaier | | H04N 21/4438 |
| | | | | 715/830 |
| 2011/0307280 A1 * | 12/2011 | Mandelbaum | | G06Q 10/025 |
| | | | | 705/6 |
| 2012/0006891 A1 * | 1/2012 | Zhou | | G06Q 30/06 |
| | | | | 235/380 |
| 2013/0024440 A1 * | 1/2013 | Dimassimo | | G06F 16/3344 |
| | | | | 707/706 |
| 2013/0047115 A1 * | 2/2013 | Migos | | G06F 3/0484 |
| | | | | 715/776 |
| 2014/0378204 A1 * | 12/2014 | Michel | | G07F 17/329 |
| | | | | 463/17 |
| 2015/0212710 A1 * | 7/2015 | Gupta | | G06Q 30/0641 |
| | | | | 715/765 |
| 2016/0350836 A1 * | 12/2016 | Burns | | G06Q 30/0625 |
| 2017/0243107 A1 * | 8/2017 | Jolley | | G06F 16/951 |
| 2018/0005305 A1 * | 1/2018 | Hirsch | | G06Q 30/0625 |
| 2018/0217990 A1 * | 8/2018 | Kumar | | G06F 16/35 |
| 2018/0232443 A1 * | 8/2018 | Delgo | | G06F 16/35 |
| 2019/0163437 A1 * | 5/2019 | Nagasaka | | G06Q 30/06 |

OTHER PUBLICATIONS

Gamzu, Iftah, Marina Haikin, and Nissim Halabi. "Query rewriting for voice shopping null queries." Proceedings of the 43rd International ACM SIGIR Conference on Research and Development in Information Retrieval. 2020. (Year: 2020).*

* cited by examiner

METHOD AND APPARATUS FOR PARSING AND REPRESENTATION OF DIGITAL INQUIRY RELATED NATURAL LANGUAGE

CROSS-REFERENCE TO RELATED APPLICATIONS

This application claims priority to U.S. Provisional Application No. 62/740,909, entitled "METHOD AND APPARATUS FOR PARSING AND REPRESENTATION OF DIGITAL INQUIRY RELATED NATURAL LANGUAGE," filed on Oct. 3, 2018, the disclosure of which is incorporated herein by reference in its entirety. Additionally, this application is related to U.S. Provisional Patent Application No. 62/740,913, filed on Oct. 3, 2018, and U.S. patent application Ser. No. 16/585,174, filed on Sep. 27, 2019, each of which is herein incorporated by reference.

TECHNICAL FIELD

The disclosure relates generally to e-commerce and, more specifically, to parsing and electronically representing e-commerce related language.

BACKGROUND

At least some known voice assistant devices, such as digital assistants, allow customers to verbally communicate with the device to perform commercial transactions with online retailers. For example, some voice assistant devices are operable to receive a verbal query from a customer, interpret the verbal query as a purchase order for an online retailer, and electronically submit the purchase order to the online retailer over a network. To successfully act in accordance with the customer's query, however, the voice assistant device must first understand the customer query. To do so, current voice assistant devices may attempt to identify the intent of the customer (e.g., such as the intent to add a product to an online shopping cart), and the entity on which the intent is to be performed (e.g., such as the product that the customer would like added to the online shopping cart). These voice assistant devices, however, have various limitations. For example, they may not properly interpret queries with multiple intents (e.g., "buy apples and checkout"), queries with negations (e.g., "do not buy apples"), ambiguous entities (e.g., "buy carrots," where carrots could be a fresh vegetable or frozen vegetable), or other complex queries (e.g., "buy milk without lactose").

SUMMARY

The embodiments described herein allow for the parsing of queries, including complex queries, as well as the generation of a semantic representation of such queries. The semantic representations described herein may include a hierarchical ontology which may consist of three main components: (1) a hierarchy of eCommerce related actions such as "ADDTOCART" and "CHECKOUT"; (2) a hierarchy of entities, such as "PERSON" or types of products that may be sold such as "DAIRY"; and (3) a hierarchy of properties such as "SIZE," "QUANTITY," and "WEIGHT."

The semantic representation defined herein captures "what is done with what" in a query. In other words, the representation may consist of zero or more instances of the actions in the above noted ontology, zero or more instances of the entities in the ontology, and zero or more instances of the properties in the ontology. The semantic representation may allow for the representation of queries with multiple intents (e.g., requested actions), the representations of queries with negations, and representations for queries with prepositions, such as for "without lactose" in the query "buy milk without lactose."

The embodiments described herein may be implemented in any suitable hardware or hardware and software, such as in any suitable computing device. For example, in some embodiments, an e-commerce system is provided that includes one or more computing devices and a database. In some embodiments, a method by one or more computing devices that includes one or more of the functions described herein is provided. In some embodiments, a non-transitory, computer-readable storage medium is provided that includes executable instructions that, when executed by one or more processors, cause the one or more processors to carry out one or more of the functions described herein.

In some embodiments, a computing device configured to generate a hierarchy of a plurality of ecommerce related actions comprising at least a first ecommerce action related to adding an item to an online shopping cart. The computing device may generate a hierarchy of entities that comprise at least a plurality of types of products that are sold on a retailer's website. The computing device may also generate a hierarchy of properties of one or more of the hierarchy of entities. The computing device may then generate a hierarchical ontology for semantic representation of a user query based on the generated hierarchy of the plurality of ecommerce related actions, the generated hierarchy of entities, and the generated hierarchy of properties of one or more of the hierarchy of entities. In some examples, the computing device may store the hierarchical ontology in a database.

In some embodiments, a computing device configured to associate a user query with at least one action, at least one entity, and at least one property of a hierarchical ontology. The computing device may also associate at least one phrase of the user query to a conceptual class of the hierarchical ontology for a product. The computing device may determine at least one syntactic dependency between the at least one phrase and other phrases of the user query. Further, the computing device may determine at least one semantic relation between the at least one phrase and the other phrases of the user query based on the at least one syntactic dependency and at least one semantic mapping rule. The computing device may then generate a semantic representation of the user query based on the at least one semantic relation between the at least one phrase and the other phrases of the user query. In some examples, the computing device may store the semantic representation of the user query in a database.

In some embodiments, a computing device is configured to receive a user query identifying a plurality of phrases. The computing device may associate the user query with at least one action based on at least one predefined tagging rule. The computing device may also determine at least one semantic dependency relationship between the plurality of phrases identified by the user query. Further, the computing device may determine at least one semantic relation between the plurality of phrases based on the at least one syntactic dependency and at least one semantic mapping rule. The computing device may also generate a semantic representation of the user query based on the at least one semantic relation. In some examples, the computing device may store the semantic representation of the user query in a database.

In some embodiments, a method, such as by one or more computing devices, includes generating a hierarchy of a plurality of ecommerce related actions comprising at least a first ecommerce action related to adding an item to an online shopping cart. The method may include generating a hierarchy of entities that comprise at least a plurality of types of products that are sold on a retailer's website. The method may also include generating a hierarchy of properties of one or more of the hierarchy of entities. The method may further include generating a hierarchical ontology for semantic representation of a user query based on the generated hierarchy of the plurality of ecommerce related actions, the generated hierarchy of entities, and the generated hierarchy of properties of one or more of the hierarchy of entities. In some examples, the method includes storing the hierarchical ontology in a database.

In some embodiments, a method, such as by one or more computing devices, includes associating a user query with at least one action, at least one entity, and at least one property of a hierarchical ontology. The method may include associating at least one phrase of the user query to a conceptual class of the hierarchical ontology for a product. The method may also include determining at least one syntactic dependency between the at least one phrase and other phrases of the user query. Further, the method may include determining at least one semantic relation between the at least one phrase and the other phrases of the user query based on the at least one syntactic dependency and at least one semantic mapping rule. The method may include generating a semantic representation of the user query based on the at least one semantic relation between the at least one phrase and the other phrases of the user query. In some examples, the method includes storing the semantic representation of the user query in a database.

In some embodiments, a method, such as by one or more computing devices, includes receiving a user query identifying a plurality of phrases. The method may include associating the user query with at least one action based on at least one predefined tagging rule. The method may also include determining at least one semantic dependency relationship between the plurality of phrases identified by the user query. Further, the method may include determining at least one semantic relation between the plurality of phrases based on the at least one syntactic dependency and at least one semantic mapping rule. The method may include generating a semantic representation of the user query based on the at least one semantic relation. In some examples, the method includes storing the semantic representation of the user query in a database.

In some embodiments, a non-transitory computer readable medium has instructions stored thereon, where the instructions, when executed by at least one processor, cause a computing device to perform operations that include generating a hierarchy of a plurality of ecommerce related actions comprising at least a first ecommerce action related to adding an item to an online shopping cart. The operations may include generating a hierarchy of entities that comprise at least a plurality of types of products that are sold on a retailer's website. The operations may also include generating a hierarchy of properties of one or more of the hierarchy of entities. The operations may further include generating a hierarchical ontology for semantic representation of a user query based on the generated hierarchy of the plurality of ecommerce related actions, the generated hierarchy of entities, and the generated hierarchy of properties of one or more of the hierarchy of entities. In some examples, the operations include storing the hierarchical ontology in a database.

In some embodiments, a non-transitory computer readable medium has instructions stored thereon, where the instructions, when executed by at least one processor, cause a computing device to perform operations that include associating a user query with at least one action, at least one entity, and at least one property of a hierarchical ontology. The operations may include associating at least one phrase of the user query to a conceptual class of the hierarchical ontology for a product. The operations may also include determining at least one syntactic dependency between the at least one phrase and other phrases of the user query. Further, the operations may include determining at least one semantic relation between the at least one phrase and the other phrases of the user query based on the at least one syntactic dependency and at least one semantic mapping rule. The operations may include generating a semantic representation of the user query based on the at least one semantic relation between the at least one phrase and the other phrases of the user query. In some examples, the operations include storing the semantic representation of the user query in a database.

In some embodiments, a non-transitory computer readable medium has instructions stored thereon, where the instructions, when executed by at least one processor, cause a computing device to perform operations that include receiving a user query identifying a plurality of phrases. The operations may include associating the user query with at least one action based on at least one predefined tagging rule. The operations may also include determining at least one semantic dependency relationship between the plurality of phrases identified by the user query. Further, the operations may include determining at least one semantic relation between the plurality of phrases based on the at least one syntactic dependency and at least one semantic mapping rule. The operations may include generating a semantic representation of the user query based on the at least one semantic relation. In some examples, the operations include storing the semantic representation of the user query in a database.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Figure 1:
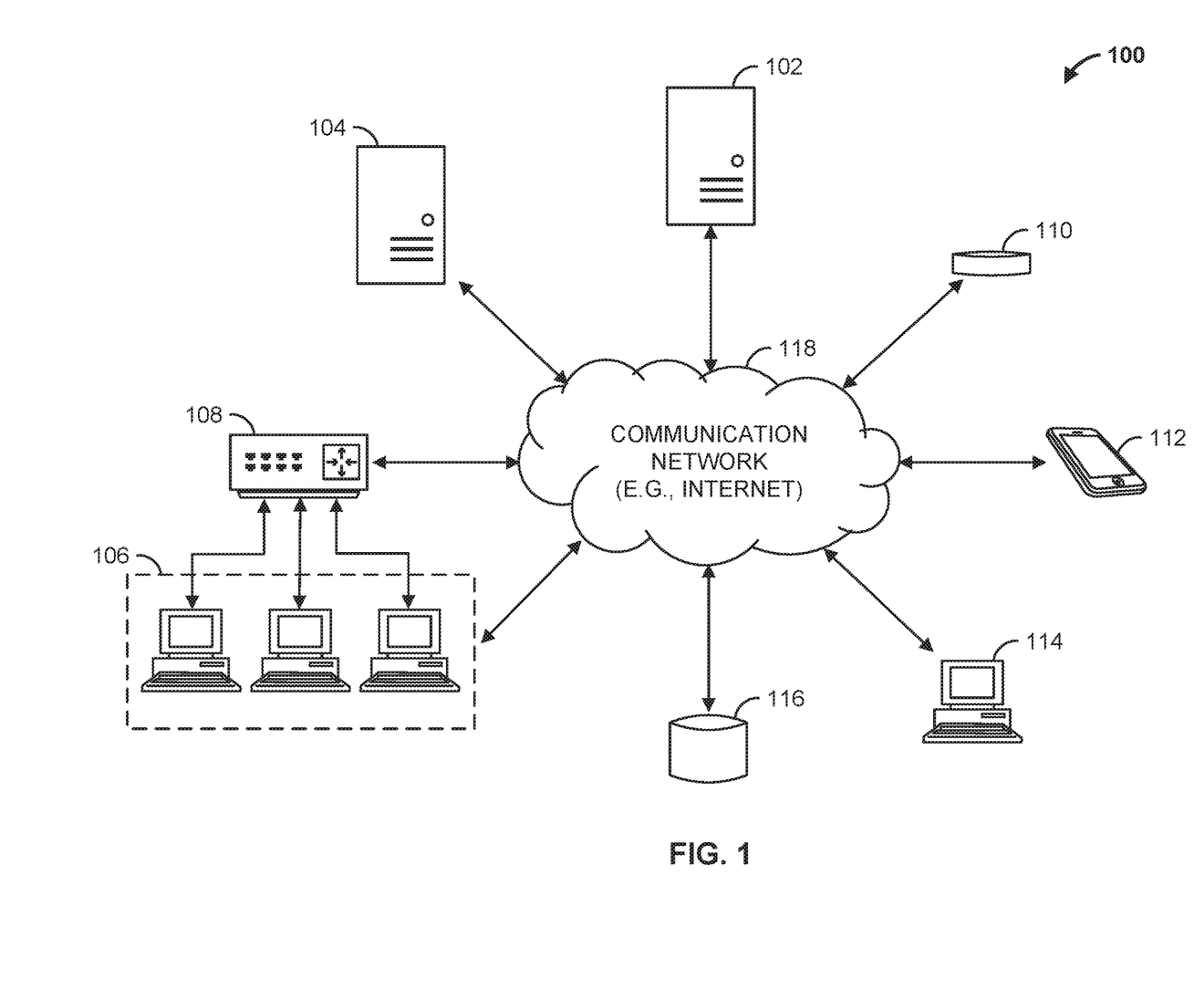
FIG. 1 is a block diagram of an e-commerce voice representation system in accordance with some embodiments.

Turning to the drawings, FIG. 1 illustrates a block diagram of an e-commerce voice representation system 100 that includes a voice representation computing device 102 (e.g., a server, such as an application server), a web hosting device (e.g., a web server) 104, workstation(s) 106, database 116, and multiple customer computing devices 110, 112, 114 operatively coupled over network 118. Voice representation computing device 102, web hosting device 104, and multiple customer computing devices 110, 112, 114 can each be any suitable computing device that includes any hardware or hardware and software combination for processing and handling information. In addition, each can transmit data to, and receive data from, communication network 118.

For example, voice representation computing device 102 can be a computer, a workstation, a laptop, a server such as a cloud-based server, or any other suitable device. Each of multiple customer computing devices 110, 112, 114 is operable to receive a verbal query and generate data representing text that corresponds to the verbal query. For example, each of multiple customer computing devices 110, 112, 114 can be a voice assistant device, a digital assistant, a mobile device such as a cellular phone, or any other suitable device.

Each of voice representation computing device 102, web hosting device 104, and multiple customer computing devices 110, 112, 114 can include one or more processors, one or more field-programmable gate arrays (FPGAs), one or more application-specific integrated circuits (ASICs), one or more state machines, digital circuitry, or any other suitable circuitry.

Although FIG. 1 illustrates three customer computing devices 110, 112, 114, e-commerce voice representation system 100 can include any number of customer computing devices 110, 112, 114. Similarly, e-commerce voice representation system 100 can include any number of workstation(s) 106, voice representation computing devices 102, web servers 104, and databases 116.

Workstation(s) 106 are operably coupled to communication network 118 via router (or switch) 108. For example, workstation(s) 106 can communicate with voice representation computing device 102 over communication network 118. The workstation(s) 106 can allow for the configuration and/or programming of voice representation computing device 102, such as the controlling and/or programming of one or more processors of voice representation computing device 102 (described further below with respect to FIG. 2).

Voice representation computing device 102 and workstation(s) 106 may be operated by a retailer. Customer computing devices 110, 112, 114 may be computing devices operated by customers of a retailer. Voice representation computing device 102 is operable to communicate with database 116 over communication network 118. For example, voice representation computing device 102 can store data to, and read data from, database 116. Database 116 can be a remote storage device, such as a cloud-based server, a memory device on another application server, a networked computer, or any other suitable remote storage. Although shown remote to voice representation computing device 102, in some examples database 116 can be a local storage device, such as a hard drive, a non-volatile memory, or a USB stick.

Communication network 118 can be a WiFi® network, a cellular network such as a 3GPP® network, a Bluetooth® network, a satellite network, or any other suitable network. Communication network 118 can provide access to, for example, the Internet.

Voice representation computing device 102 can also communicate with first customer computing device 110, second customer computing device 112, and Nth customer computing device 114 over communication network 118. Similarly, first customer computing device 110, second customer computing device 112, and Nth customer computing device 114 are operable to communicate with voice representation computing device 102 over communication network 118. For example, voice representation computing device 102 can receive data (e.g., messages) from, and transmit data to, first customer computing device 110, second customer computing device 112, and Nth customer computing device 114.

E-commerce voice representation system 100 may allow for the parsing of verbal queries, including complex verbal queries, by the generation of semantic representations of such verbal queries. The semantic representations of the verbal queries may be used to perform one or more requested actions of the verbal queries.

For example, one or more of first customer computing device 110, second customer computing device 112, and Nth customer computing device 114 may receive a verbal query, such as a "add 1 pound apples to my cart," from a customer wanting to place an order from a retailer. Customer computing device 110, 112, 114 may translate the verbal query to data representing the text that corresponds to the verbal query, and may transmit the data to voice representation computing device 102. Voice representation computing device 102 may generate a semantic representation of the verbal query, and transmit the semantic representation to web server 104. Web server 104 may then add 1 pound of apples to the requester's online shopping cart. Voice representation computing device 102 may then transit to the customer computing device 110, 112, 114 data indicating that the apples were added to the requester's online shopping cart. Customer computing device 110, 112, 114 may then provide a conversational reply that the apples were added to the requester's online shopping cart, such as "1 pound of apples were added to your cart."

Figure 2:
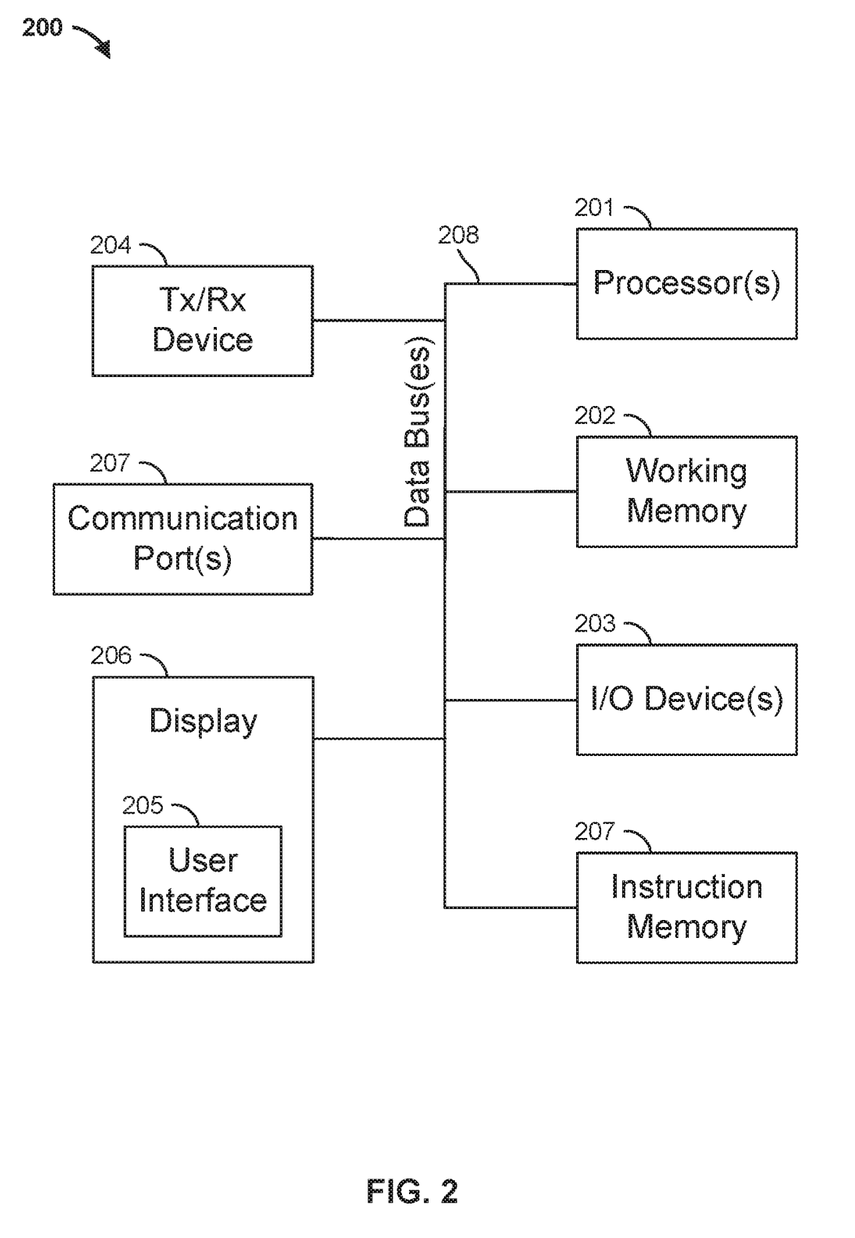
FIG. 2 is a block diagram of the voice representation computing device of the e-commerce voice representation system of FIG. 1 in accordance with some embodiments.

FIG. 2 illustrates the voice representation computing device 102 of FIG. 1. Voice representation computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of voice representation computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as data related to semantic representations of user queries.

Display 206 can display user interface 205. User interfaces 205 can enable user interaction with voice representation computing device 102. For example, user interface 205 can be a user interface for an application that allows for the viewing of semantic representations of user queries. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 voice representation computing device 102 will be operating in. Processor(s) 201 is operable to receive data from, or send data to, a network, such as communication network 118 of FIG. 1, via transceiver 204.

Figure 3:
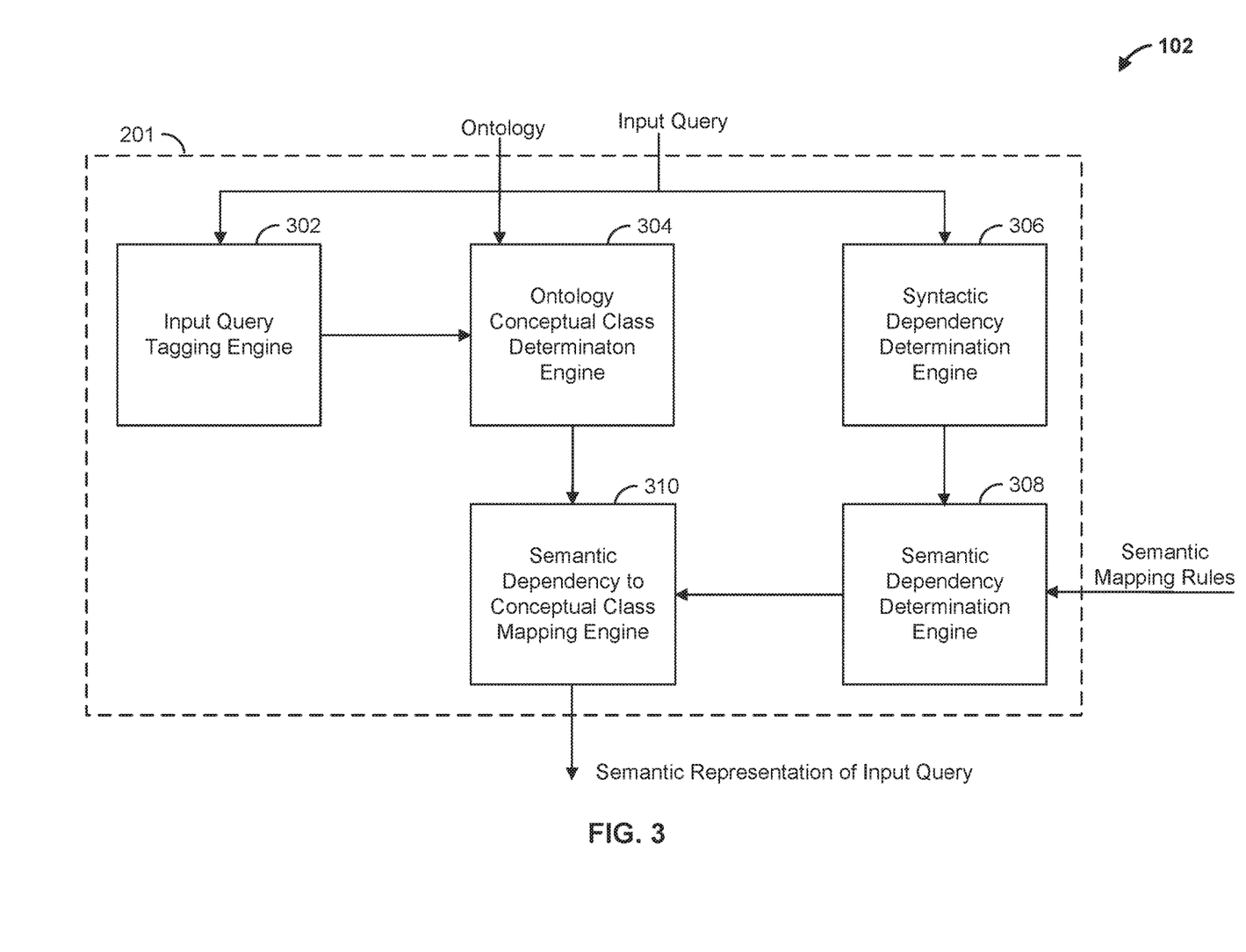
FIG. 3 is a block diagram illustrating examples of various portions of the voice representation computing device of FIG. 1 in accordance with some embodiments.

FIG. 3 is a block diagram illustrating examples of various portions of the voice representation computing device 102 of FIG. 1. As indicated in the figure, voice representation computing device 102 may include input query tagging engine 302, ontology conceptual class determination engine 304, syntactic dependency determination engine 306, semantic dependency determination engine 308, and semantic dependency to conceptual class mapping engine 310. One or more of these engines may be implemented by, for example, one or more of processor(s) 201 of FIG. 2.

Input query tagging engine 302 is operable to receive an input query, which may be data representing text that corresponds to a verbal query, and may tag each phrase of the input query based on a predefined set of tags, as well as an extra tag for products, such as a tag "PRODUCT." The predefined set of tags may be made up of all the actions and properties of the ontology described below with respect to FIG. 4 below.

Ontology conceptual class determination engine 304 is operable to receive the tagged phrases of the input query from input query tagging engine 302, and associate (e.g., link) any phrases tagged as products to a conceptual class in an ontology, such as the one described below with respect to FIG. 4. A conceptual class may be, for example, a type of product.

For example, a search on a retailer's website may be performed to find the top products for each phrase tagged as a product. The types or classes of a number (e.g., two) of the top products returned may then be retrieved from a predetermined products catalog, such as one stored in database 116. The products catalog may include, for example, a hierarchy of product types. Ontology conceptual class determination engine 304 may determine the least common ancestor of the products, and determine it to be the conceptual class of the concerned product phrase. The tagged actions, properties, and entities of the phrases remain the same.

Syntactic dependency determination engine 306 is operable to receive the input query and extract dependency relationships between the words in the query to generate syntactic dependency data. The syntactic dependency data may be, for example, a syntactic dependency graph. This dependency parsing of the input query may be a rooted directed acyclic graph with nodes representing words in the query and edges labeled with syntactic dependencies among words, as is described below with respect to FIGS. 5 and 6. Syntactic dependency determination engine 306 may be, for example, a syntactic dependency parser.

Semantic dependency determination engine 308 is operable to transform the syntactic dependency data received from syntactic dependency determination engine 306 to semantic data, such as a semantic data graph, based on semantic mapping rules. Semantic dependency determination engine 308 may use conceptual classes such as products, actions, and properties, along with other data such as the types of nodes connected through a specific syntactic relation, to generate the semantic data. The semantic mapping rules may be based on node type information, as well as the syntactic dependency relation between words of the input query, which is received in the syntactic dependency data from syntactic dependency determination engine 306.

Semantic dependency to conceptual class mapping engine 310 is operable to receive conceptual classes from ontology conceptual class determination engine 304, and semantic data from semantic dependency determination engine 308, to generate a semantic representation of the input query. For example, semantic dependency to conceptual class mapping engine 310 may add conceptual classes, such as actions, entities, and properties, received from ontology conceptual class determination engine 304, and add them to a semantic data graph received from semantic dependency determination engine 308. Semantic dependency to conceptual class mapping engine 310 may also add variables for each non-class node.

Figure 4:
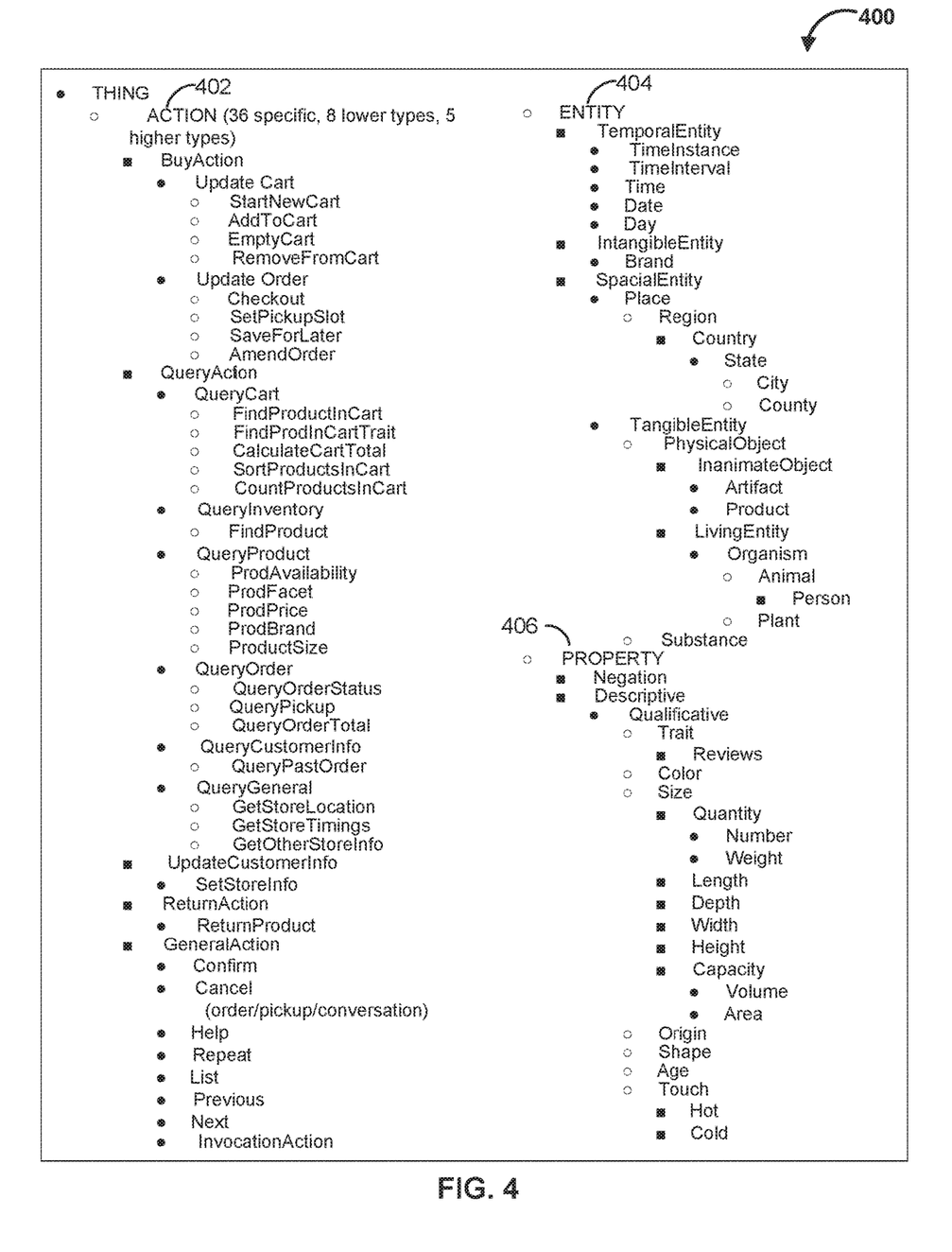
FIG. 4 is a diagram of an example ontology that can be implemented by the e-commerce voice representation system of FIG. 1 in accordance with some embodiments.

FIG. 4 illustrates an example ontology that can be implemented by the e-commerce voice representation system of FIG. 1. As indicated in the diagram, the ontology is hierarchical and includes actions 402, entities 404, and properties 406. Actions 402 may include "BuyAction," "QueryAction," "UpdateCustomerInfo," "ReturnAction," or "GeneralAction." Each of these actions may include one or more (lower) subtypes of actions (e.g., "Update Cart"), where each of the subtypes of actions may include one or more specific actions (e.g., "StartNewCart").

Entities 404 may include "TemporalEntity," "IntangibleEntity," and "SpacialEntity." Each of these entities may include one or more (lower) subtypes of entities (e.g., "Place"), where each of the subtypes of entities may include one or more specific attributes (e.g., "Region"), and even one or more sub-categories of attributes (e.g., "Country," "State," "City").

Properties 406 may include "Negation" and "Descriptive." Each of these may include subtypes of properties (e.g., "Qualificative"), as well as one or more sub-categories of attributes (e.g., "Trait," "Reviews").

Figure 5:
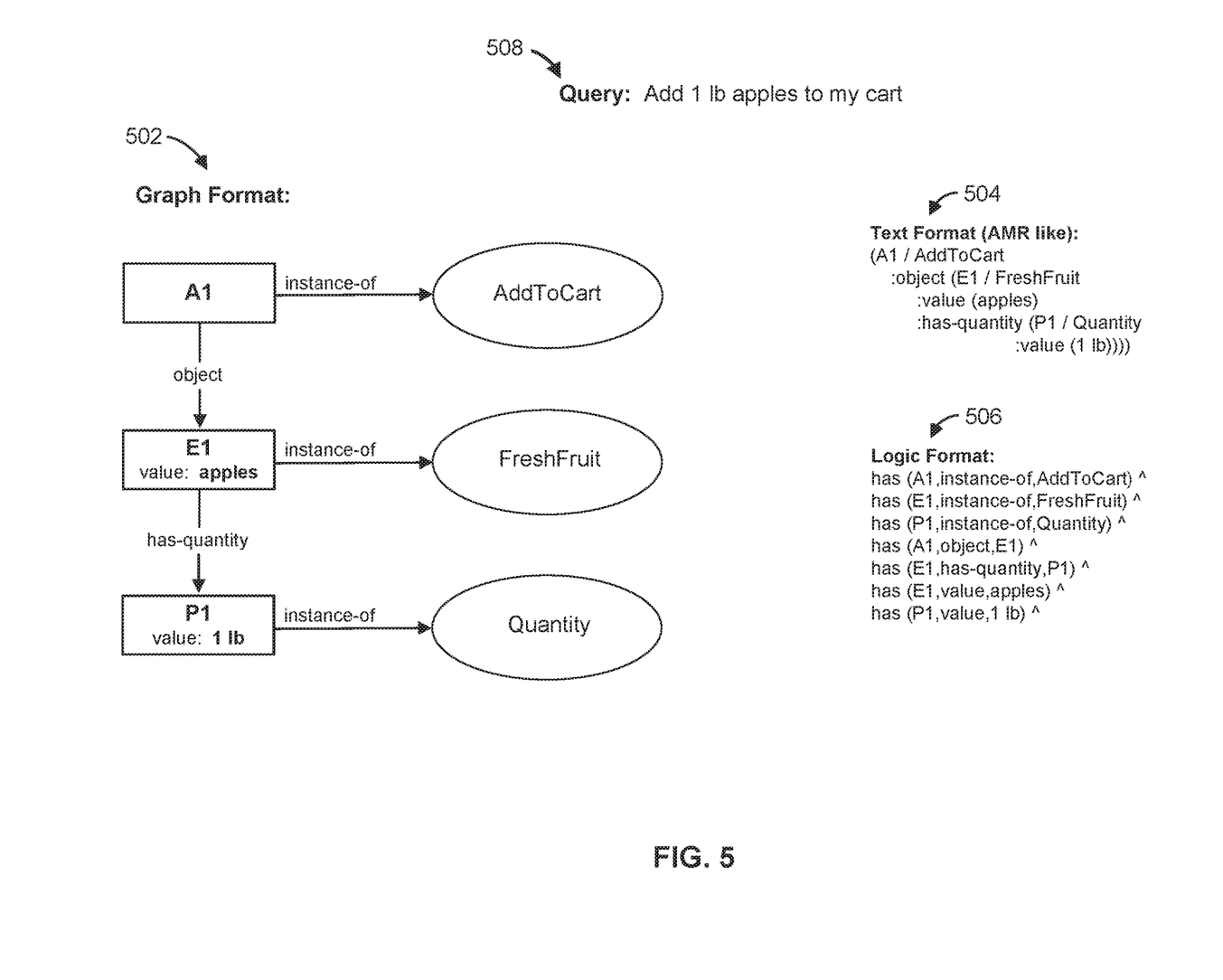
FIG. 5 is a diagram illustrating example formats of a semantic representation of a user query.

FIG. 5 is a diagram illustrating example formats of a semantic representation of a user query 508 using, for example, the ontology of FIG. 4. The semantic representation may be generated and presented in a graphical form 502, in a textual form 504, or in a logical form 506. For example, the semantic representation may be may be a rooted, edge labeled, directed acyclic graph that includes internal nodes and concept nodes, where there is an "instance-of" relationship from an internal node to a concept node. Internal nodes may represent instances of actions, entities and properties in the ontology. For example, the nodes A1, E1 and P1, as shown for each of the graphical form 502, textual form 504, and logical form 506 representations of FIG. 5, are internal nodes. Concept nodes may represent actions, entities, and properties in the ontology. For example, a concept node may define the class of an item in a given query.

The semantic representation may include semantic relations between internal and concept nodes including action-action relations such as next-action, action-entity relations such as object, action-property relations such as is-negative, entity-entity relations such as has-brand, entity-property relations such as has-weight, and instance to class relations such as instance-of.

The semantic representation may represent different customer queries similarly. In other words, there may be more than one customer query which are semantically the same but syntactically different. The representations of such queries may be the same. For example the query 508 "Add 1 lb apples to my cart" shown in FIG. 5 and a second query "Buy 1 lb apples" may be represented similarly.

When there is more than one instance of an action in a query, the semantic representation captures the relationship between those instances with a semantic edge between those instances. An example of such an edge (next-action) is as shown in the representation of "Buy milk then set pickup to Tuesday" below.

```
(a / BuyAction
    :object (e / Dairy
        :value (milk)
        :next-action (p / SetPickupSlot
            :has-day (d / Day
                :value (Tuesday)))))
```

The semantic representation may also handle negations. One type of negation may exist with respect to an action, and another type of negation may exist with respect to an entity. Both negation types may be represented using a relation such as is-negative. For example, one example of a negation with respect to an action in a query may be seen in the query "Do not buy an apple," which may be represented as shown below:

```
(a / BuyAction
    :is-negative ( t / Binary
        :value (true))
    :object (e / FreshFruit
        :value (apple)
        :has-count (p / Count
            :value (1))))
```

One example of a negation with respect to an entity in a query may be seen in the query "Buy 1 banana, not apple," which may be represented as shown below:

```
(a / BuyAction
    :object (e / FreshFruit
        :value (banana)
        :has-count (p / Count
            :value (1)))
        :subject (e / FreshFruit
            :value (apple)
            :is-negative ( t / Binary
                :value (true))))
```

The semantic representation may support other aspects as well, such as support for specific semantic relations for prepositions. For example in the representation of the query "Buy milk without lactose" there may be a relation labeled not-containing from a node for "milk" to a node for "lactose".

Figure 6:
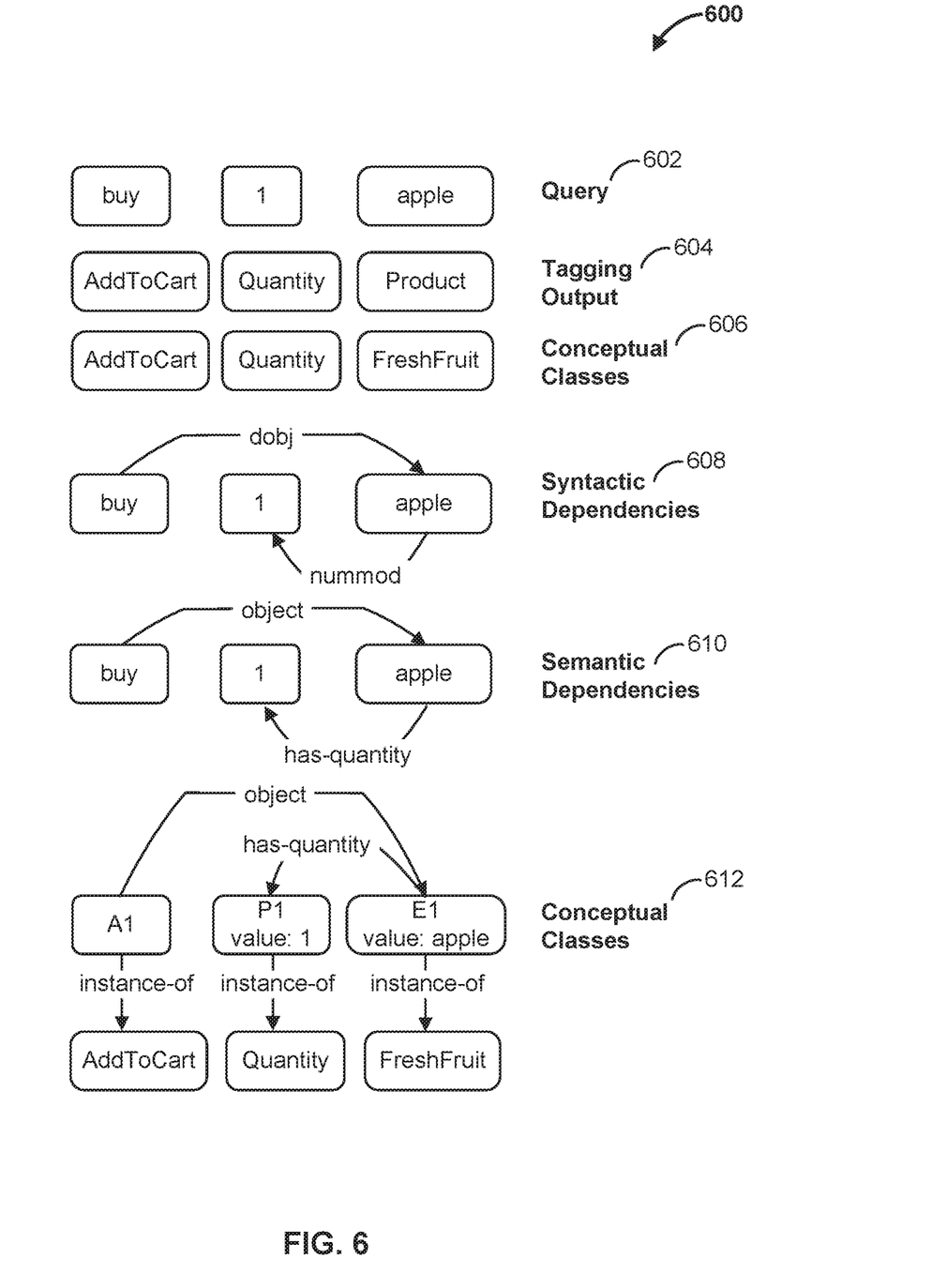
FIG. 6 is a diagram illustrating an example algorithm for generating a semantic representation of a user query.

FIG. 6 is a diagram illustrating steps of an example algorithm 600 for generating a semantic representation of a sample user query 602, "buy 1 apple." The algorithm may be implemented by, for example, the voice representation computing device 102 of FIG. 1. User query 602 may be data representing a textual form of translated voice, such as one that may be received from a voice assistant device. At step 604, the user query 602 is tagged with (e.g., assigned to) a predefined set of tags. The predefined set of tags may be stored in database 116 of FIG. 1, for example. Here, "buy" is tagged with "AddToCart," "1" is tagged with "Quantity," and "apple" is tagged with "Product." Step 604 may be performed, for example, by the input query tagging engine 302 of FIG. 3.

At step 606, the products in the user query 602 are linked to conceptual classes on an ontology, such as the ontology of FIG. 4. The conceptual classes of actions, properties, and entities other than products remain the same. For example, in the previous step, the word "apple" of user query 602 was tagged as "Product." In this step, "apple," because it was tagged as a "Product," is linked to a conceptual class, here "FreshFruit." In some examples, the conceptual class for a phrase marked as "Product" is determined based on performing a search, via a search interface (e.g., application programming interface (API)), such as one to a retailer's website, for the phrase tagged as a "Product" (here, "apple"). The types or classes of the top number (e.g., two) products returned may then be retrieved from a pre-extracted product's online catalog, and the least common ancestor conceptual class of the search results may be used as the conceptual class for the phrase. Step 606 may be performed, for example, by the ontology conceptual class determination engine 304 of FIG. 3.

At step 608, the dependency relationships between the words in a given query may be determined. In this example, the phrase "apple" is determined to be a direct object ("dobj") of the phrase "buy," and the phrase "1" is determined to be a number modifier ("nummod") of the phrase "apple." Step 608 may be performed, for example, by the syntactic dependency determination engine 306 of FIG. 3.

At step 610, a semantic graph is generated based on the syntactic dependencies determined in the previous step, as well as a set of semantic mapping rules, such as the semantic mapping rules described with respect to FIG. 3. The semantic mapping rules may be stored, for example, in database 116 of FIG. 1. In this example, semantic mapping rules are used to determine that the phrase "apple" is an "object" of the phrase "buy," and that there should be a quantity of "1" of the object apple. For example, an "object" field of the semantic representation for the user query 602 may be set to "apple," while the phrase "1" may be set to a "has-quantity" sub-field of the "object" field of the semantic representation for the user query 602. Step 610 may be performed, for example, by the semantic dependency determination engine 308 of FIG. 3.

At step 612, the semantic graph generated in the previous step is updated by adding the conceptual classes of actions, entities, and properties that were determined in step 606. In addition, variables may be added for non-class nodes, such as the internal nodes discussed above with respect to FIG. 5. In this example, the "instance-of" field for variable "A1" is set to "AddToCart." Similarly, the "instance-of" field for variable "P1" is set to "Quantity," and the "instance-of" field for variable "E1" is set to "FreshFruit." In addition, a value field for variable "P1" is set to "1," and a value field for variable "E1" is set to "apple." Actions such as "AddToCart" represented by, in this example, variable "A1," typically do not include a value field. Step 612 may be performed, for example, by the semantic dependency to conceptual class mapping engine 310 of FIG. 3.

Figure 7:
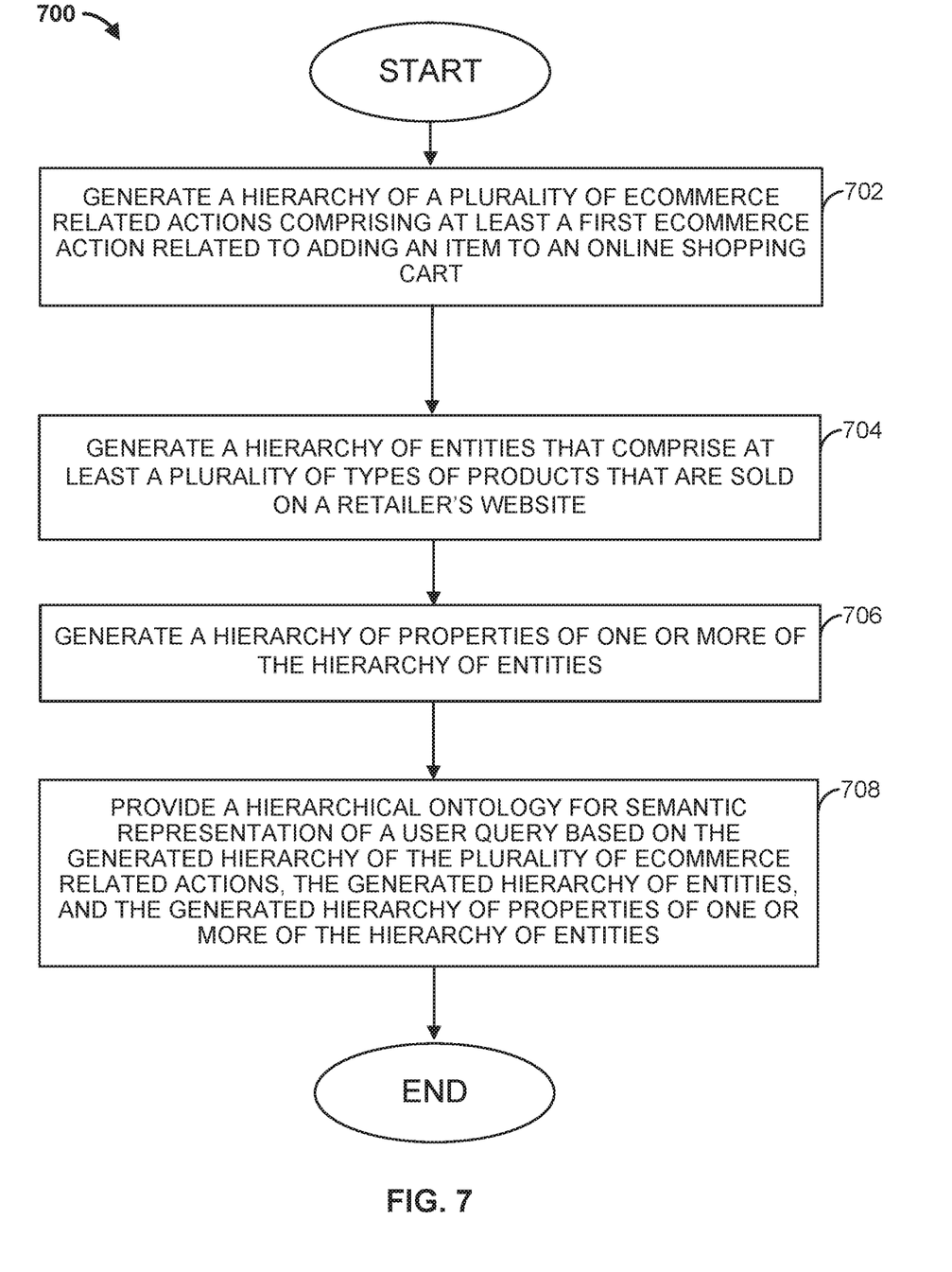
FIG. 7 is a flowchart of an example method that can be carried out by the e-commerce voice representation system of FIG. 1 in accordance with some embodiments.

FIG. 7 is a flowchart of an example method 700 that can be carried out by the voice representation computing device 102 of FIG. 1. At step 702, a hierarchy of a plurality of ecommerce related actions comprising at least a first ecommerce action related to adding an item to an online shopping cart (e.g., "AddToCart") is generated. At step 704, a hierarchy of entities that comprise at least a plurality of types of products that are sold on a retailer's website is generated. At step 706, a hierarchy of properties of one or more of the hierarchy of entities is generated. At step 708, a hierarchical ontology is provided for semantic representation of a user query based on the generated hierarchy of the plurality of ecommerce related actions, the generated hierarchy of entities, and the generated hierarchy of properties of one or more of the hierarchy of entities. For example, the hierarchical ontology may be transmitted to a customer computing device.

Figure 8:
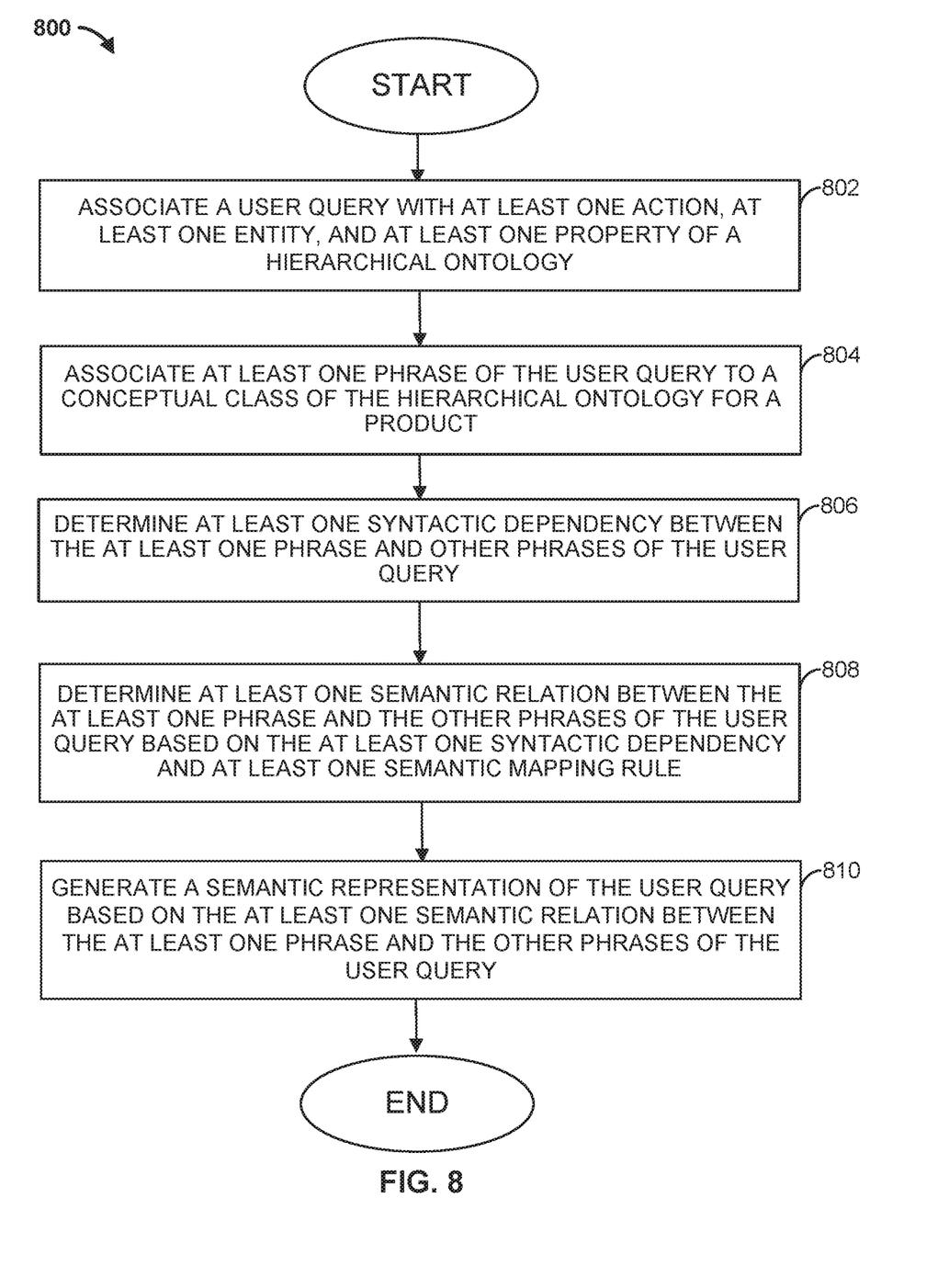
FIG. 8 is a flowchart of another example method that can be carried out by the e-commerce voice representation system of FIG. 1 in accordance with some embodiments.

FIG. 8 is a flowchart of another example method 800 that can be carried out by the voice representation computing device 102 of FIG. 1. At step 802, a user query is associated with at least one action, at least one entity, and at least one property of a hierarchical ontology. Actions of the hierarchical ontology may represent any action that a user can take as part of an ecommerce transaction (e.g., product discovery, checkout, post transaction, etc.). Although in this example the user query is associated with at least one action, at least one entity, and at least one property of a hierarchical ontology, a user query may not require to be associated with an entity or a property. For example, a user query that is associated with an action such as "Checkin," which may be an action associated with checking in with a grocery store for grocery item pickup, does not require an entity or a property. In some examples, if a user query associated with an action does not require an entity or a property, the user query may be associated with a default entity and default property, such as a predefined value.

At step 804, at least one phrase of the user query is associated with a conceptual class of the hierarchical ontology for a product. At step 806, at least one syntactic dependency between the at least one phrase and other phrases of the user query is determined. At step 808, at least one semantic relation between the at least one phrase and the other phrases of the user query is determined based on the at least one syntactic dependency and at least one semantic mapping rule. At step 810, a semantic representation of the user query is generated based on the at least one semantic relation between the at least one phrase and the other phrases of the user query.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
   a database; and
   a computing device communicatively coupled to the database and configured to:
   a non-transitory memory;
   a transceiver communicatively coupled to the database and the non-transitory memory via at least one data bus, the transceiver operative to:
      receive a user query identifying a plurality of phrases and store the user query in the non-transitory memory, each phrase comprising a plurality of words, wherein the user query is a translation of a verbal query to text;
      receive, from the database, a plurality of product types for a plurality of products for each of the plurality of phrases, wherein the plurality of products are determined based on each corresponding phrase of the plurality of phrases;
   an input query tagging engine communicatively coupled to the non-transitory memory via the at least one data bus, the input query tagging engine configured to generate tagged data associating the user query with at least one action based on at least one predefined tagging rule, wherein the tagged data is stored in the non-transitory memory;
   a syntactic dependency determination engine communicatively coupled to the input query tagging engine, the syntactic dependency determination engine configured to determine at least one syntactic dependency relationship between the plurality of words of the plurality of phrases identified by the user query, wherein the syntactic dependency relationship is stored in the non-transitory memory via the at least one data bus;
   a semantic determination engine communicatively couped to the syntactic dependency determination engine, the semantic determination engine configured to determine at least one semantic relation between the plurality of words of the plurality of phrases based on the at least one syntactic dependency relationship and at least one semantic mapping rule, wherein the at least one semantic relation is stored in the non-transitory memory via the at least one data bus;
   a conceptual class mapping engine communicatively coupled to the semantic determination engine, the conceptual class mapping engine configured to:
      determine a least common ancestor conceptual class of conceptual classes of a hierarchical ontology for each of the plurality of phrases based on the plurality of product types corresponding to each of the plurality of phrases;
      generate a semantic representation of the user query based on the least common ancestor conceptual classes of the conceptual classes, the at least one semantic relation, and the tagged data; and
      store the semantic representation in the database.

2. The system of claim 1, wherein determining the at least one semantic dependency relationship between the plurality of words of the plurality of phrases comprises determining a first word of a first phrase of the plurality of phrases that is a direct object of a second word of the first phrase.

3. The system of claim 2, wherein the computing device is configured to determine that the first word identifies an object, and the second word identifies the at least one action.

4. The system of claim 1, wherein the at least one predefined tagging rule associates at least one word of the plurality of words of the at least one phrase of the plurality of phrases with the at least one action.

5. The system of claim 1, wherein the computing device is configured to:
   receive, via the transceiver, the hierarchical ontology; and
   associate, via the conceptual class mapping engine, the user query with at least one action, at least one entity, and at least one property of the hierarchical ontology.

6. The system of claim 5, wherein the hierarchical ontology comprises:
   a hierarchy of a plurality of ecommerce related actions comprising the at least one action;
   a hierarchy of entities that comprise the at least one entity, wherein the hierarchy of entities identify a plurality of types of products that are sold on a retailer's website; and
   a hierarchy of properties comprising the at least one property, wherein the hierarchy of properties identify properties of one or more of the hierarchy of entities.

7. The system of claim 1, wherein the computing device is a first computing device, wherein the system comprises a second computing device, and wherein the second computing device is configured to:
   receive a verbal query from a user;
   translate the verbal query to the user query; and
   transmit the user query to the first computing device.

8. A method by at least one processor, the method comprising:
   receiving, via a transceiver, a user query identifying a plurality of phrases, each phrase comprising a plurality of words, wherein the user query is a translation of a verbal query to text;
   storing the user query in non-transitory memory;
   generating, via an input query tagging engine, tagged data associating the user query with at least one action based on at least one predefined tagging rule, wherein the tagged data is stored in the non-transitory memory;
   determining, via a syntactic dependency determination engine, at least one syntactic dependency relationship between the plurality of words of the plurality of phrases identified by the user query, wherein the syntactic dependency relationship is stored in the non-transitory memory;
   determining, via a semantic determination engine, at least one semantic relation between the plurality of words of the plurality of phrases based on the at least one syntactic dependency relationship and at least one semantic mapping rule, wherein the semantic relation is stored in the non-transitory memory;
   receiving, from a database via transceiver, a plurality of product types for a plurality of products for each of the plurality of phrases, wherein the plurality of products are determined based on each corresponding phrase of the plurality of phrases;
   determining, via a conceptual class mapping engine, a least common ancestor conceptual class of conceptual classes of a hierarchical ontology for each of the plurality of phrases based on the plurality of product types corresponding to each of the plurality of phrases;
   generating, via the conceptual class mapping engine, a semantic representation of the user query based on the least common ancestor conceptual classes of the conceptual classes, the at least one semantic relation, and the tagged data; and storing the semantic representation in the database.

9. The method of claim 8 further comprising determining a first word of a first phrase of the plurality of phrases that is a direct object of a second word of the first phrase.

10. The method of claim 9 further comprising determining that the first word identifies an object, and the second word identifies the at least one action.

11. The method of claim 8 further comprising:
receiving the hierarchical ontology; and
associating the user query with at least one action, at least one entity, and at least one property of the hierarchical ontology.

12. The method of claim 11, wherein the hierarchical ontology comprises:
a hierarchy of a plurality of ecommerce related actions comprising the at least one action;
a hierarchy of entities that comprise the at least one entity, wherein the hierarchy of entities identify a plurality of types of products that are sold on a retailer's website; and
a hierarchy of properties comprising the at least one property, wherein the hierarchy of properties identify properties of one or more of the hierarchy of entities.

13. A non-transitory computer readable medium having instructions stored thereon, wherein the instructions, when executed by at least one processor, cause a device to perform operations comprising:
receiving, via a transceiver, a user query identifying a plurality of phrases, each phrase comprising a plurality of words, wherein the user query is a translation of a verbal query to text, and wherein the user query is stored in a non-transitory memory;
generating, via an input query tagging engine, tagged data associating the user query with at least one action based on at least one predefined tagging rule, wherein the tagged data is stored in the non-transitory memory;
determining, by a syntactic dependency determination engine, at least one syntactic dependency relationship between the plurality of words of the plurality of phrases identified by the user query, wherein the syntactic dependency relationship is stored in the non-transitory memory;
determining, by a semantic determination engine, at least one semantic relation between the plurality of words of the plurality of phrases based on the at least one syntactic dependency relationship and at least one semantic mapping rule, wherein the at least one semantic relation is stored in the non-transitory memory;
receiving, from a database, a plurality of product types for a plurality of products for each of the plurality of phrases, wherein the plurality of products are determined based on each corresponding phrase of the plurality of phrases;
determining, by a conceptual class mapping engine, a least common ancestor conceptual class of conceptual classes of an hierarchical ontology for each of the plurality of phrases based on the plurality of product types corresponding to each of the plurality of phrases;
generating, by the at least one processor, a semantic representation of the user query based on the least common ancestor conceptual classes of the conceptual classes, the at least one semantic relation, and the tagged data; and storing, by the at least one processor, the semantic representation in the database.

14. The non-transitory computer readable medium of claim 13 further comprising instructions stored thereon that, when executed by at least one processor, further cause the device to perform operations comprising determining a first word of a first phrase of the plurality of phrases that is a direct object of a second word of the first phrase.

15. The non-transitory computer readable medium of claim 14 further comprising instructions stored thereon that, when executed by at least one processor, further cause the device to perform operations comprising determining that the first word identifies an object, and the second word identifies the at least one action.

16. The non-transitory computer readable medium of claim 13 further comprising instructions stored thereon that, when executed by at least one processor, further cause the device to perform operations comprising:
receiving the hierarchical ontology; and
associating the user query with at least one action, at least one entity, and at least one property of the hierarchical ontology.

17. The system of claim 1, wherein the syntactic dependency determination engine is configured to generate a syntactic dependency graph having nodes representing one or more words of the user query and edges labeled with syntactic dependencies, wherein the syntactic dependency graph is stored in the non-transitory memory.

18. The system of claim 17, wherein the semantic determination engine is configured to generate a semantic data graph including the nodes of the syntactic dependency graph and one or more semantic connections between the nodes, and wherein the semantic determination engine is configured to store the semantic data graph in the non-transitory memory.

19. The method implemented by a processor of claim 8, wherein the syntactic dependency determination engine is configured to generate a syntactic dependency graph having nodes representing one or more words of the user query and edges labeled with syntactic dependencies, wherein the syntactic dependency graph is stored in the non-transitory memory, wherein the semantic determination engine is configured to generate a semantic data graph including the nodes of the syntactic dependency graph and one or more semantic connections between the nodes, and wherein the semantic determination engine is configured to store the semantic data graph in the non-transitory memory.

20. The non-transitory computer readable medium of claim 13, wherein the syntactic dependency determination engine is configured to generate a syntactic dependency graph having nodes representing one or more words of the user query and edges labeled with syntactic dependencies, wherein the syntactic dependency graph is stored in the non-transitory memory, wherein the semantic determination engine is configured to generate a semantic data graph including the nodes of the syntactic dependency graph and one or more semantic connections between the nodes, and wherein the semantic determination engine is configured to store the semantic data graph in the non-transitory memory.

* * * * *